United States Patent [19]

Sato

[11] 4,420,774
[45] Dec. 13, 1983

[54] FM DATA RECORDING AND PLAYBACK METHOD AND APPARATUS

[75] Inventor: Hiroshi Sato, Fujisawa, Japan

[73] Assignee: Daiichi Electric Co., Ltd., Fujisawa, Japan

[21] Appl. No.: 479,975

[22] Filed: Mar. 29, 1983

Related U.S. Application Data

[63] Continuation-in-part of Ser. No. 212,221, Dec. 2, 1980, abandoned.

[30] Foreign Application Priority Data

Dec. 26, 1979 [JP] Japan .............................. 54-168268

[51] Int. Cl.³ .......................... G11B 5/00; G11B 5/02
[52] U.S. Cl. ........................................... 360/28; 360/8
[58] Field of Search ............................. 360/8, 73, 28

[56] References Cited

U.S. PATENT DOCUMENTS 2,807,797  9/1957  Shoemaker ........................... 360/28
3,181,133  4/1965  Seirner ................................. 360/28
3,803,632  4/1974  Irwin ................................... 360/73

Primary Examiner—Vincent P. Canney
Attorney, Agent, or Firm—Wenderoth, Lind & Ponack

[57] ABSTRACT

A method and apparatus for recording a data signal and for playing it back at a variable speed ratio including a recording unit, a playback unit and a speed control unit. A modulated carrier wave is first recorded and subsequently played back at a different speed from the recorded speed. A recording speed control signal controls the recording speed through the speed control unit, and a part of the speed control signal is recorded simultaneously with a data signal from a miniature test model on a record medium, such as a magnetic tape, by a write unit, such as a recording head, after being operated on by the data signal. The playback speed is controlled by a playback speed control signal at a variable speed ratio, so that it is possible to achieve any speed ratio, such as $\sqrt{10}$, etc., between the recording speed and the playback speed. The speed ratio is directly proportional to the size ratio between the size of the miniature test model and the actual physical size of the structure such as a building, dam or the like. The recorded signal is operated on by a speed signal when it is played back and is reproduced by a read unit such as a reproducing head. Thus, the desired data signal at a desired speed ratio can be read out when being played back.

5 Claims, 5 Drawing Figures

FM DATA RECORDING AND PLAYBACK METHOD AND APPARATUS

CROSS REFERENCE TO RELATED APPLICATIONS

The present application is a continuation-in-part of now abandoned application Ser. No. 212,221, filed Dec. 2, 1980.

BACKGROUND OF THE INVENTION

The invention relates generally to an FM data recorder and a method for recording a data signal and playing it back and more particularly to an FM data recorder and the method for recording a data signal received from a miniature test model under test, the miniature model representative of an actual real life model. The recorded information is played back, by control of a speed control signal, at a speed ratio directly proportional to the size ratio between actual size and miniature size.

In a conventional FM data recorder and method for recording a data signal and for playing it back at a different speed ratio from the recorded speed, the speed ratio between the recording and playback speeds is not variable. Therefore, the playback speed is not directly and linerly proportional to the input data signal and input speed control signal contrary to prior art.

Whereas, in the FM data recorder and method for recording a data signal from a miniature test model and for playing it back of the present invention, a vibration signal and/or the like received from the miniature test model indicates the strength, the character and/or the like of the miniature test model which would be representative of a real life model or actual structure such as a building, dam or the like.

When a big structure such as a dam is to be constructed, a miniature test model thereof is tested instead of an actual real life model, as it is almost impossible to construct such a big actual life model for the test. However, the data signal from a miniature test model under test is, of course, different from the data signal which would be received from an actual real life model if it was tested, as they are different in size. Consequently, the data signal from a miniature test model under test should be converted into a data signal which is representative of an actual real life model or actual structure. However, the ratio in size between the miniature test model and the actual structure has to be an "integral number" such as one tenth, one twentieth, etc., because of easier computation in constructing the miniature test model. The ratio data signal between input (recording) and output (playback) as a function of an input data signal, such as a vibration signal, between the miniature test model and the actual structure is directly proportional to the "square root" of size ration between the miniature size and actual life size. Consequently, it is necessary to achieve such a "square root" ratio.

A conventional FM data recorder, however, records a data signal from a miniature test model under test and plays it back at an "integral" speed ratio, so that the played back data signal is "similar" to that which would be received from a real case (i.e. if the actual structure would be put under test). Whereas, this invention employs an FM data recorder which records a data signal from a miniature test model under test and which plays it back at a square root ratio in speed, so that the played back data signal is the "same" as that which would be obtained if the actual structure would be put under test.

As mentioned above, the conventional FM data recorder has an integral ratio in speed between recording a data signal and playing it back. For example, the ratio is 1:2:4:8:16:32, 1:2:5:10:20 or the like. However, when a miniature test model is one tenth as small as an actual structure in size, the real ratio of data received between them is the square root of 10 or 3.1623 - - -. Consequently, a conventional FM data recorder cannot play back a data signal perfectly equivalent to data which would be recorded from an actual structure, since a conventional FM data recorder does not account for the required ratio in speed unless it is made especially for such a ratio.

Furthermore, if presently available FM data recorders are compensated for the square root problem, a different FM data recorder will be required for each different size ratio between a miniature test model and an actual structure thereof, since the size ratio of one combination, such as a building and a miniature test model, is different from the size ratio of another combination, such as another building or a dam and a miniature test model thereof.

On the other hand, the present invention employs a recording speed control signal which controls the recording speed of the FM data recorder and is simultaneously recorded with a data signal on a record medium such as a magnetic tape, and the playback speed is controlled by a variable speed control signal for playback; thus, it is possible to achieve any speed ratio between the recording speed and playback speed. Accordingly, desired data at a desired speed ratio can be read out when it is played back.

The reason why a conventional FM data recorder requires a non-variable speed means is that it requires a good S/N ratio. As in FM broadcasting, the FM data recorder has a carrier frequency wave (fo) which is modulated by an input data signal (Ein). The frequency-modulated carrier wave (fo$\pm \Delta$f) is recorded on a magnetic tape through the write amplifier. When it is played back, the read head reads or reproduces the frequency-modulated carrier wave, which is then demodulated to obtain a data signal, and a conventional mechanical variable speed control means creates a lot of noise or wow and/or flutter due to the inevitable unstable speed of the mechanism.

It is therefore necessary to maintain a stable tape speed. If the tape speed of the FM data recorder is unstable, the carrier wave is modulated by the input data signal (Ein) as well as by the variation of the unstable tape speed.

This can be represented by the formula:

$$fo \pm \Delta f \pm \Delta S$$

When the tape speed is too unstable, the variation in unstable tape speed ($\Delta$S) exceeds the input data signal ($\Delta$f). Whereas, wow and/or flutter is/are required to be lower than 0.4%, the tape speed is required to be stable in order to improve the S/N ratio.

Furthermore, a conventional FM data recorder is not able to linearly vary the tape speed but only able to step the tape speed up or down with a mechanical step means or switching steps of the motor speed.

On the other hand, the present invention employs a means for linearly varying the tape speed, and can therefore achieve any speed ratio, e.g.—the square root of 10 or 3.1623 - - -, between the recording speed and the playback speed. However, it does not mean the tape speed is varied "during" recording or playback. It must be stable "during" that time. It can be varied "before" beginning the recording of a data signal or before playing it back, so that a desired speed ratio, such as 3.1623 - - -, between the recording speed and the playback speed can be achieved to perfectly represent the ratio in size between a miniature test model and an actual structure, such as a dam, building and the like.

BRIEF SUMMARY OF THE INVENTION

It is an object of the present invention to provide a method for recording a data signal and playing it back at a variable speed ratio using an FM data recorder.

It is another object of the present invention to provide a method for controlling recording and playback speeds by variable speed control signals so that a desired variable speed ratio between the recording speed and the playback speed can be perfectly achieved using an FM data recorder.

Another object of the present invention is to provide an FM data recorder for recording a data signal and playing it back at a variable speed ratio.

It is another object of the present invention to provide an FM data recorder for controlling the recording and playback speeds by a variable speed control signal so that a desired variable speed ratio can be perfectly achieved.

A further object of the present invention is to provide a universal FM data recorder having a good S/N ratio and is to provide a method for obtaining a good S/N ratio using an FM data recorder.

It is another object of the present invention to provide an FM data recorder having (a) digital operational amplifier(s), with A/D converters and (a) D/A converters.

Another object of the present invention is to provide an FM data recorder having (a) digital operational amplifier(s), (a) digital modulator(s). (a) digital demodulator(s) and/or a servoamplifier instead of analog types, using microprocessor and/or PLL (phase locked loop) techniques.

It is a further object of the present invention to provide a universal FM data recorder having a wide variety of speed ratios between recording and playing back.

Furthermore, it is another object of the present invention to provide an FM data recorder being able to record a data signals corresponding to random signal waves and play said signals back with a variable speed ratio.

Still furthermore, it is another object of the present invention to provide an FM data recorder and the method for recording a data signal from a miniature test model and playing it back as a perfect data signal that would be received from the actual structure corresponding to said model.

It is furthermore an object of the present invention to provide an FM data recorder and method for easily processing a data signal from a miniature test model which is representative of a data signal from an actual structure.

The various features of novelty which characterize the present invention are pointed out with particularity in the claims annexed to and forming a part of this specification. For a better understanding of the invention, its operating advantage, and specific objects attained by its use, reference should be had to the accompanying drawings and descriptive matter in which there is illustrated and described a preferred embodiment of the invention. It should be understood that any change within the scope of the claims may be restored to without departing from the spirit of the invention or sacrificing any of the advantages thereof.

DESCRIPTION OF THE PREFERRED EMBODIMENTS

A preferred embodiment of the present invention will now be described by way of example, by reference of the accompanying drawings.

The present invention comprises a recording means, a playback means and a speed control means.

Figure 1:
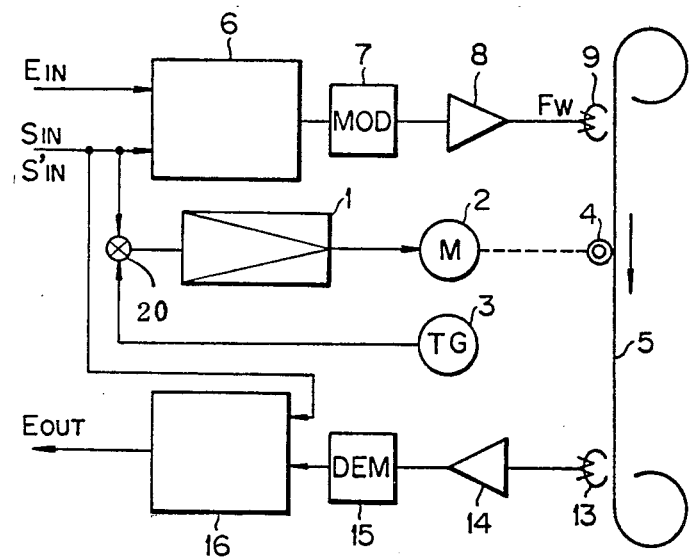
FIG. 1 is a block diagram of an embodiment of the FM data recorder recording and playback method and the device therefor of the present invention.

Said recording means is composed of a recording operational amplifier 6, a modulator 7, a write amplifier 8, and a write means 9 such as a write head or recording head as shown in FIG. 1. The recording operational amplifier 6 has two inputs. The first input has a data signal (Ein) from a miniature test model, and the second input has a variable recording speed control signal (Sin). Consequently, the signals are operated on by the recording operational amplifier 6, the output of which is fed into the modulator 7, modulating the frequency of the carrier wave being generated in the modulator 7. The modulated carrier wave is then fed into the write amplifier 8, being amplified by the write amplifier 8. The amplified carrier wave is finally fed into the write head 9. The modulated amplified carrier wave is thereby recorded or written onto a record medium 5 such as a magnetic tape, disc and the like. In this embodiment, a write head and a magnetic tape are used as the write means 9 and the record medium 5. However, this invention should not be limited to a write head and a magnetic tape but also includes means using magnetic discs, other discs, laser systems, photo systems, etc.

Said playback means is composed of a read means such as a read head or reproducing head 13, an amplifier 14, a demodulator 15 and a playback operational amplifier 16. The read head 13 reproduces said modulated and recorded carrier wave (Fw), which contains the data signal and the recording speed control signal, from the magnetic tape 5. The reproduced modulated carrier wave (Fr) is fed into the amplifier 14. The reproduced carrier wave (Fr) is amplified and is then fed into the demodulator 15. The modulated carrier wave is demodulated into a data signal and recording speed control signal based on the playback speed, and is fed into the first input of the playback operational amplifier 16; a playback speed control signal (S'in) is fed into the second input of the playback operational amplifier 16. The operated signal and the playback speed control signal (S'in) are operated on. Consequently, data is obtained from the output of the playback operational amplifier 16.

Said speed control means or servo-driving means can be any one which controls the recording speed and playback speed at a certain speed ratio. However, in this embodiment, it is composed of a tacho-generator 3, a comparator or adder 20, servoamplifier 1, a motor 2 and a capstan 4. The tacho-generator 3 detects the present speed of the mechanism and generates signals for driving the motor 2, and the output of the techo-generator 3 is fed into the comparator 20. A recording speed control signal (Sin) is fed the comparator 20, too, through a connection between the input of the recording operational amplifier 6 and the input of the comparator 20. The output of the comparator 20 is fed into the servo-amplifier 1. A stable speed control signal is obtained when said recording speed control signal (Sin) is not varied. Consequently, the motor 2 turns as an order of the recording speed signal, and the capstan 4 being connected to the motor 2 drives the magnetic tape 5 as the order of the recording speed control signal.

When it is played back, a playback speed signal (S'in) is fed into the input of the comparator 20. Therefore, the magnetic tape 5 is driven at a speed decided by the playback speed control signal (S'in) in the same way as mentioned above. Any speed ratio between the recording speed and the playback speed can thereby be achieved.

Figure 2:
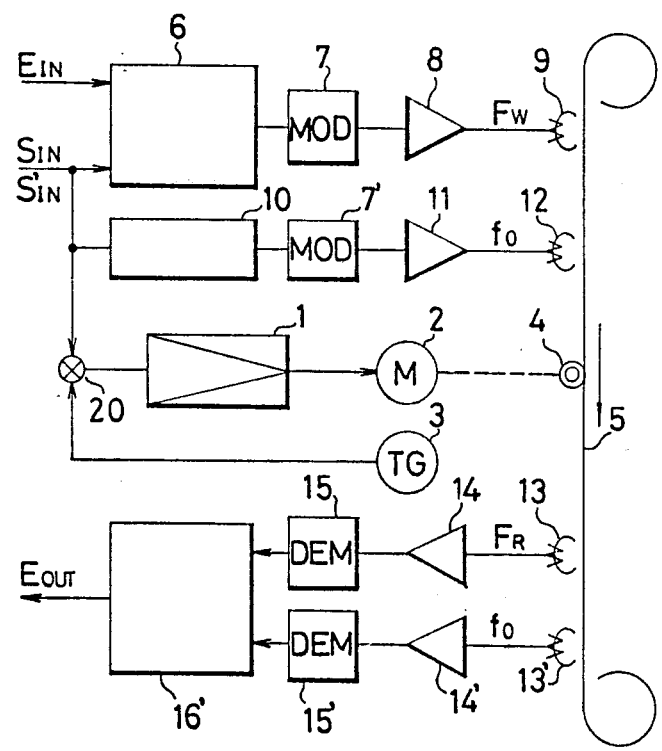
FIG. 2 is another block diagram of another embodiment of the present invention.

As shown in FIG. 2, another embodiment is illustrated, in which the recording means has a recording S/N compensation means and the playback means has a playback S/N compensation means, which makes a S/N compensation means. Wow and flutter, which constitutes noise, are thereby lowered almost to zero.

Said recording S/N compensation means is composed of a multiplier 10, a modulator 7', a center frequency write amplifier 11 and a center frequency write means such as a write head, a recording head 12 or the like. Said multiplier or operational amplifier 10 multiplies said variable recording speed control signal (Sin) by a coefficient (k) and produces the center frequency (fo), which is written or recorded into another track of said record medium such as the magnetic tape 6 by a center frequency write means such as a center frequency write head 12 through a center frequency write amplifier 11, and a part of which will be the carrier wave of the modulator 7'.

Said playback S/N compensation means is composed of a center frequency read means such as a read head or reproducting head 13', a center frequency amplifier 14', a center frequency demodulator 15', and a playback operational amplifier 16'. Said recorded center frequency (fo) is recorded by said center frequency read head 13' from said magnetic tape 5, and is fed into a center frequency amplifier 14' and then into said center frequency demodulator 15', wherein the center frequency is demodulated into only wow and flutter, which constitutes noise, and the wow and flutter is fed into the playback operational amplifier 16'. In this configuration, when the operated carrier wave (Fw) is recorded on the magnetic tape 5, an unstable recording speed modulates the operated modulated carrier wave (Fw), which causes wow and flutter. However, the center frequency (fo) being recorded into another track of the magnetic tape 5 is also modulated by the same unstable recording speed, which causes wow and flutter. Therefore, the wow and flutter on the recorded modulated carrier wave (Fw) can be canceled by the wow and flutter on the recorded center frequency (fo) when it is played back and operated on by the playback operational amplifier 16'. And the recorded modulated carrier wave (Fw) is modulated by an unstable playback speed when it is played back, which causes wow and flutter. However, the recorded center frequency (fo) is also modulated by the same unstable playback speed when it is played back from the tape 5, which causes wow and flutter. Consequently, the wow and flutter on the reproduced modulated carrier wave (Fr) can be canceled by the wow and flutter on the reproduced center frequency when it is played back and operated on by the playback operational amplifier 16', because reproduced center frequency has exactly the same wow and flutter as that the reproduced modulated carrier wave has; thus, both wow and flutters can then be canceled. The reproduced modulated carrier wave (Fr) is demodulated by the demodulator 15' into a signal based on the data and the recording speed control signal. However, this signal has wow and flutter. The reproduced center frequency is also demodulated into only noise, which is the wow and flutter. The wow and flutter on the signal based on the data signal and the recording speed control signal can be canceled when operated on by the playback operational amplifier 16. Of course, the playback speed is different from the recorded speed. However, it affects nothing with respect to the function mentioned above, because the recorded modulated carrier wave (Fw) has exactly the same wow and flutter as that of the recorded center frequency, and the reproduced modulated carrier wave (Fr) also has exactly the same wow and flutter as that the reproduced center frequency has even if they are played back at a different speed from the recording speed.

As shown in FIG. 2, a data signal $E_{in}$ and a recording speed signal $S_{in}$ are fed into the multiplier 6, which multiplies the signals:

$$E_{in} \cdot S_{in}$$

The output $E_{in} \cdot S_{in}$ of the multiplier 6 is fed into the modulator 7, wherein $E_{in}$ is $f_o \pm \Delta f$ and $S_{in}$ is $S_i$. That is;

$$f_i = S_i(f_o \pm \Delta f)$$

where;
$f_i$=carrier wave
$f_o$=center frequency
$S_i$=coefficient determined by a tape speed $v_o$ The $f_i$ is fed into the amplifier 8 and fed into the head 9 as $F_w$. The operation of FIG. 2 is as follows:

A data signal $E_{in}$ and a speed signal $S_{in}$ are fed into the multiplier 6, the output of which $E_{in} \cdot S_{in}$ modulates the carrier wave in the frequency modulator 7 into;

$$f_i = S_i(f_o \pm \Delta f)$$

Then, the amplifier 8 amplifies it into $F_w$, and the write head 9 is driven so that it is the same as the one shown in FIG. 1. $S_{in}$ is multiplied by the multiplier 10, producing $k \cdot S_{in}$ modulates the carrier wave in modulator 7', thereby producing $f_o$. Since the speed of the servo motor 2 is proportional to $S_{in}$, the tape speed $v_o$ is;

$$S_{in} = v_o$$

Then, signal at write head 12 is;

$$v_o \cdot f_o$$

Therefore, if $S_i = v_o$ ($S_i$ is coefficient determined by the tape speed $v_o$), the following is written on the signal track of the tape 5.

$$\frac{S_i(f_o \pm \Delta f)}{v_o} = f_o \pm \Delta f$$

$S_{in}$ is written on the compensation track of tape 5 as:

$$\frac{v_o \cdot f_o}{v_o} = f_o$$

Thus, they are always the same irrespective of the tape speed. The $f_o \pm \Delta f$ written on the signal track and $f_o$ written on the compensation track are read out by read heads 13 and 13' respectively.
The signal from the read head 13 is:

$$(v_o \pm \Delta v)(f_o \pm \Delta f)$$

where;
  $v_o$: tape speed at play back
  $\Delta v$: wow-and-flutter
The signal from the read head 13' is:

$$(v_o \pm \Delta v)f_o$$

The signals are respectively demodulated by frequency demodulators 15 and 15' into analog signals and divided by operational amplifier 16' as follows;

$$\frac{(v_o \pm \Delta v)(f_o \pm \Delta f)}{(v_o \pm \Delta v)f_o} = \frac{f_o \pm \Delta f}{f_o} + = \pm \Delta f$$

Thus, $E_{out} \pm \Delta f$ can be obtained. Since $v_o$ and $\Delta v$ are canceled by the division, wow-and-flutter is eliminated. Therefore, an output which is proportional to the input $E_{in}$ can be obtained.

It is an alternative to the above mentioned embodiment, wherein a plurality of the data signals ($E_{in}$'s) are inputted instead of one data signal ($E_{in}$) when the FM data recorder is required to simultaneously record different data signals ($E_{in}$'s). Therefore, in this embodiment, the FM data recorder employs a plurality of said recording means and a plurality of said playback means. Of course it is unnecessary to employ a plurality of said speed control means and a plurality of said S/N compensation means.

Referring to FIG. 1, there is illustrated a simplified embodiment of the present invention. It is an alternative to the above mentioned embodiment for the case where the tape speed is stable without wow and flutter. In this embodiment, a part of the various playback speed control signal (S'in) is fed into the operational amplifier 16, in conjunction with the data signal through the read head 13, the operational amplifier 14, and the demodulator 15. The desired data (Eout) can be obtained, since (Eout) is:

$$\left(\frac{Fr}{k} \cdot S'in\right)$$

Figure 3:
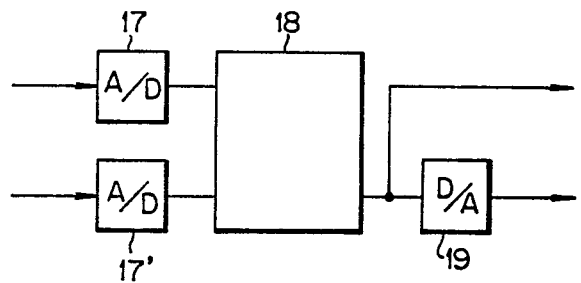
FIG. 3 is a partial block diagram of the present invention.

Referring to FIG. 3, another embodiment is illustrated in accordance with the present invention, in which the above mentioned recording and/or playback operational amplifier(s) can be analog type, since it is possible to employ A/D converters 17, 17' which are connected to the inputs of a digital operational amplifier 18, and a D/A converter 19 is employed, which is connected to the digital amplifier 18. It is an alternative to the above mentioned embodiments, wherein the operational amplifiers 6, 10, 16 and/or 16', the modulators 7 and 7', the demodulator 15 and/or 15', and/or servoamplifier 1 employ(s) (a) digital means such as a microprocessor and PLL (phase locked loop) techniques.

It is an alternative to the above mentioned embodiment of the FM data recorder of the present invention, in which is possible to vary any speed, for example, just the recording speed, just the playback speed or the recording speed and the playback speed.

Figure 4:
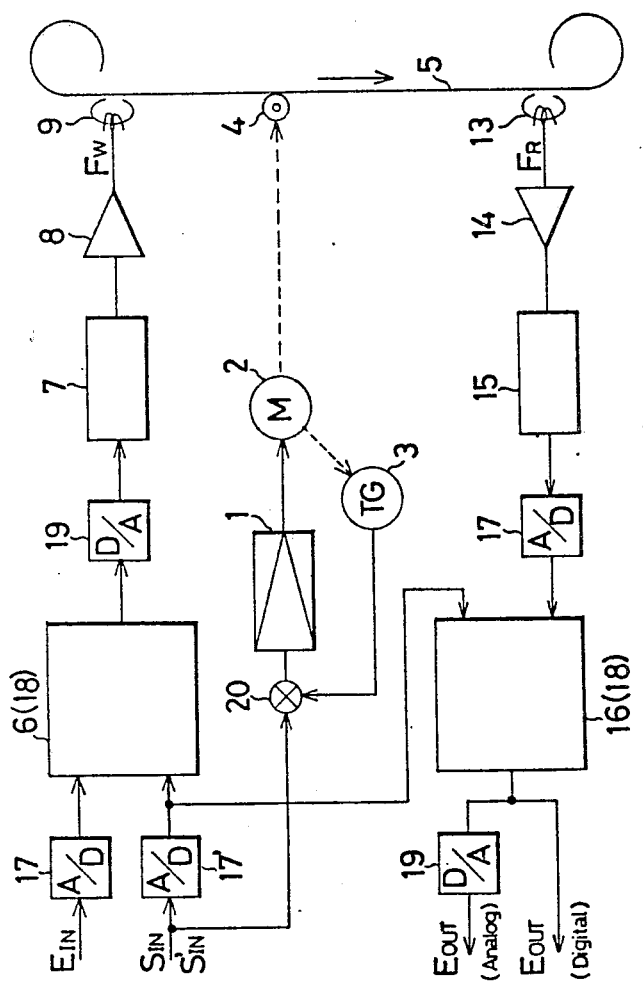
FIGS. 4 and 5 respectively correspond to FIGS. 1 and 2 but utilize the A/D and D/A converters and digital processing unit of FIG. 3.
Figure 5:
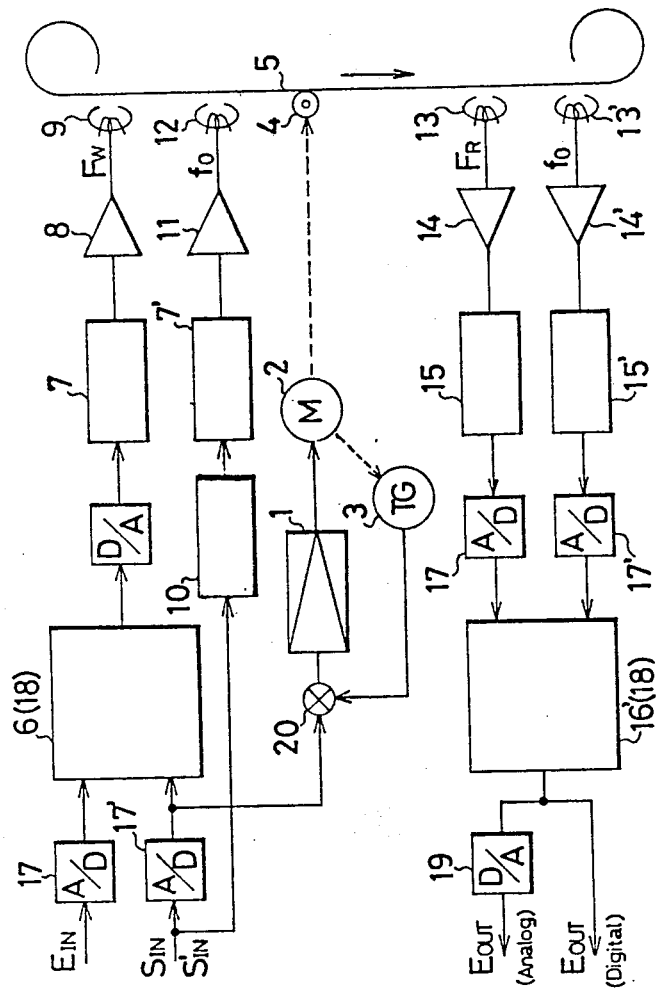

FIGS. 4 and 5 respectively correspond to FIGS. 1 and 2 but utilizing the A/D and D/A converters 17, 17' and 19 and digital processing unit 18 of FIG. 3. The operation of FIGS. 4 and 5 essentially correspond to that of FIGS. 1 and 2 and accordingly, a detailed description thereof has been omitted.

To further clarify the operation of the present invention, in FIG. 1, the operational amplifier 6 works as a "multiplier" which multiplies an input signal $E_{in}$ and tape speed control signal $S_{in}$, the output of which $E_{in} \cdot S_{in}$ is input into the FM modulator 7. The modulator outputs a modualted wave $f_i = S_{in}(f_o \pm \Delta f)$, which is proportional to the input signal $E_{in} \cdot S_{in}$. It is written or recorded on a tape 5 through the amplifier 8.

The relative speed $v_o$ of the tape 5 is a speed which is proportional to the speed control signal $S_{in}$. Therefore, the pitch P of the modulated wave $f_i$ recorded on the tape 5 is;

$$P = v_o/f_i$$

Therefore, $v_o = S_i$;

$$\frac{S_i}{S_i(f_o \pm \Delta f)} = \frac{1}{f_o \pm \Delta f} = P$$

This shows that modulated wave $f_i$ is always recorded on the tape 5 at the same pitch P regardless the relative speed $v_o$.

For example;
If $E_{in} = 1$ V $\pm 0.5$ V, and $S_{in} = 1$ V or 4 V;
  The output $E_{in} \cdot S_{in}$ of the operational amplifier 6 is:
  1 V $\pm 0.5$ V when $S_{in}$ is 1 V, and;
  4 V $\pm 2$ V when $S_{in}$ is 4 V.
The output $f_i$ of the FM modulator 7 is; 1 V, if it is decided as $f_o$ when the level at the input of the modulator 7, and if $f_o$ is decided as 1 KHz;
  $S_{in}$ ... 1 V, 1 KH$\pm 0.5$ KHz ($\pm 50\%$ Deviation)
  $S_{in}$ ... 4 V, 4 KH$\pm 2$ KHz ($\pm 50\%$ Deviation)
These modulated waves are recorded on the tape 5. If tape speed $v_o = 1''$/Sec when $S_{in}$ is 1 V;
  pitch P at $f_{min}$, 1 KHz$-0.5$ KHz$=0.5$ KHz, P$=1''$/500 Hz$=1/500$ inch, pitch P at $f_o$, P$=1''$/1000 KHz$=1/1000$ inch, and pitch P at $f_{max}$, 1 KHz$+0.5$ KHz,
  P$=1''$/1500 KHz$=1/1500$ inch.

If tape speed $v_o$—4"/Sec when $S_{in}$ is 4 V;

pitch P at $f_{min}$, 4 KHz−2 KHz=2 KHz,

P=4"/2 KHz=1/500 inch, pitch P at $f_o$, 4 khz±0=4 KHz,

P=4"/4 KHz=1/1000 inch, and pitch P at $f_{max}$, 4 KHz+2 KHz=6 KHz,

P=4"/6 KHz=1/1500 inch.

Thereby, it is understood that it is always at the same pitch, $P=1/f_o\pm\Delta f$, if there are no wow-and-flutters $\Delta v$.

It is also understood from FIG. 7, wherein input signal $E_{in}$ varies from 0.5 V, 1 V to 1.5 V, it is also possible to vary it from −0.5 V, 0 V to 0.5 V by shifting the voltage by means of an adder.

This information $1/f_o\pm\Delta f$ in the tape 5 is reproduced as an electrical signal by read head 13. The voltage $v_o$ at the reproduction is controlled by $S_{in}$. The tape speed during reproduction is defined as $S_o$. Thereby, the reproduced modulated wave into the FM demodulator 15 is:

$$f_i = S_o(f_o \pm \Delta f)$$

And the demodulated wave is defined as $E_{in}$. Then the formula is: $E_{in}=kS_o\cdot\Delta f$ which is divided by the operational amplifier 16.

Thereby, $E_o$ is obtained.

$$E_o = \frac{k S_o \cdot \Delta f}{S_{in}}$$

The servoamplifier 1 is controlled by tape speed control signal $S_{in}$, which sets the tape speed at $v_o$. Thereby:

$$S_{in} = S_o$$

Therefore, $$E_o = k \cdot \Delta f$$

wherein; k=coefficient of the tape speed

Thereby, it can obtain an output which is proportional to the modulation, which shows that it can obtain a voltage which is proportional to an input signal $E_{in}$ at any tape speed $v_o$. The time axis of the voltage wave of $E_{in}$ is shortened or lengthened as:

$$v_w/v_r$$

wherein;

$v_w$=tape speed at recording
$v_r$=tape speed at playback

For example, if a 100 Hz sine wave is recorded when the tape speed is 2"/Sec, it produces a 50 Hz sine wave when the playback tape speed is 1"/Sec. If a 10 Hz sine wave is recorded when the recording tape speed is 1"/Sec, it produces 1 100 Hz sine wave when the playback tape speed is 10"/Sec.

In FIG. 2, the operational amplifier has the same function as that of the operational amplifier 6 in FIG. 1, but which is used as an adder, and the operational amplifier 16' is also the same type as the operational amplifier 16 in FIG. 1 but used as a divider.

In FIG. 2, the speed control signal $S_{in}$ is changed to central frequency $f_o$ then once recorded on the tape 5 through the head 12. Thereafter, it is reproduced when the tape is played back. The produced central frequency $f_o$ is demodulated in the demodulator 15' into speed control signal $S_{in}$. Therefore, in this auxiliary channel, $1/f_o$ is always recorded at any relative speed $v_o$. Therefore:

$$f_a = S_o \cdot f_o$$

wherein; $S_o$ is the tape speed at playback which is proportional to $v_o$.

Therefore, it can always obtain a frequency which is proportional to $v_o$, so that it can also be used for reducing wow-and-flutter.

Consequently, it is possible to cancel the wow-and-flutter by dividing the information channel $f_i$ by the auxiliary channel $f_a$ in the operational amplifier 16'.

The reproduced frequency at the auxiliary channel is:

$$f_a = S_o \cdot f_o \Delta v / v_o$$

wherein:

$\Delta v$ is the wow-and-flutter and:
$f_a$ is the frequency of the auxiliary channel The reproduced frequency $f_i$ at the information channel is:

$$f_i = S_o(f_o \pm \Delta f)\Delta v / v_o$$

Then;

$$\frac{f_i}{f_a} = \frac{S_o(f_o \pm \Delta f)\frac{\Delta v}{v_o}}{S_o \cdot f_o \cdot \Delta v} = \frac{f_o \pm \Delta f}{f_o} = \pm \Delta f$$

Thereby, the speed information $S_o$ and the wow-and-flutter $\Delta v/v_o$ are canceled and the depth of modulation $\Delta f$ is obtained.

I claim:

1. An FM data recorder, comprising:
   (A) a recording means comprising:
      (a) a recording operational amplifier having two inputs, the first input having a data signal from a miniature test model under test, and the second input having a recording speed control signal, said signals being operated on by said operational amplifier;
      (b) a modulator, the input of which is connected to said recording operational amplifier, said operated signals modulating a frequency of the carrier wave in said modulator;
      (c) a write amplifier, the input of which is connected to said modulator, said operated modulated carrier wave being amplified by said write amplifier;
      (d) and a write means, the input of which is connected to said write amplifier, said amplified modulated carrier wave being written by said write means onto a record medium;
   (B) a playback means comprising:
      (a) a read means which reproduces the recorded modulated carrier wave from said record medium;
      (b) a read amplifier, the input of which is connected to said read means, said reproduced modulated carrier wave being amplified by said read amplifier;
      (c) a demodulator, the input of which is connected to said read amplifier, said amplified modulated carrier wave being demodulated into a data and recording speed control signal based on a playback speed;

(d) and a playback operational amplifier, the input of which is connected to said demodulator, said playback operational amplifier operating on said demodulated carrier wave which is said data and recording control signal, and a speed control signal based on a playback speed control signal, said playback operational amplifier outputting only the desired data signal:

(C) a speed control means which controls a recording speed and a playback speed by two different speed control signals which have a variable speed ratio between the recording speed and the playback speed, whereby said variable speed ratio is directly proportional to the size ratio between said miniature test model size and an actual physical size of a structure.

2. An FM data recorder as claimed in claim 1, in which said recording means has a S/N compensation means comprising:

(A) a recording S/N compensation means comprising:
  (a) a multiplier, the input of which is connected to the recording speed control signal input of said recording operational amplifier, and which multiplies said inputted recording speed control signal by a coefficient, which produces the center frequency;
  (b) a center frequency write amplifier, the input of which is connected to said multiplier, and which amplifies said center frequency;
  (c) and a center frequency write means which writes said amplified center frequency onto said record medium;

(B) and a playback S/N compensation means comprising:
  (a) a center frequency read means which reproduces a center frequency which contains at least one of wow and flutter which cause noise, from said record medium;
  (b) a center frequency amplifier, the input of which is connected to said center frequency read means, and which amplifies the reproduced center frequency having at least one of wow and flutter;
  (c) a center frequency demodulator, the input of which is connected to said center frequency amplifier, and which demodulates said amplified reproduced center frequency having said at least one of wow and flutter into only noise, which is said at least one of wow and flutter;
  (d) and a playback operational amplifier with two inputs, the first input being connected to the output of said playback demodulator, the second input being connected to the output of said center frequency demodulator, said playback operational amplifier operating on said operated data and speed control signal, which has at least one of wow and flutter, from said playback demodulator and also operating on said center frequency having the same at least one of wow and flutter, said operational amplifier for playback outputting only the desired data signal said at least one of wow and flutter as well as without said recording speed control signal.

3. An FM data recorder as claimed in claim 1, in which said FM data recorder comprises a plurality of said recording means and a plurality of said playback for simultaneously recording a plurality of different data signals and for simultaneously playing them back at a desired data ratio.

4. An FM data recorder as claimed in claim 1, in which said FM data recorder may vary just the recording speed, or just the playback speed, or both the recording speed and the playback speed.

5. An FM data recorder as claimed in claim 1, in which at least one of said recording operational amplifier and said playback operational amplifier are analog amplifiers comprising:
  (a) an A/D converter, which converts analog signals into digital signals, and the input of which has data signals applied thereto;
  (b) an A/D converter, which converts analog signals into digital signals, and the input of which has speed control signals applied thereto;
  (c) a digital operational amplifier which operates on said signals from said A/D converter;
  (d) and a D/A converter, which converts digital signals into analog signals, and the input of which is connected to the output of said digital operational amplifier.

* * * * *